United States Patent

Vlahovic

[11] Patent Number: 5,944,377
[45] Date of Patent: Aug. 31, 1999

[54] FLOOR ASSEMBLY FOR A PASSENGER CAR AND METHOD OF MAKING SAME

[75] Inventor: Josip Vlahovic, Bietigheim-Bissingen, Germany

[73] Assignee: Dr. Ing. h.c.F. Porsche AG, Weissach, Germany

[21] Appl. No.: 08/889,801

[22] Filed: Jul. 8, 1997

[30] Foreign Application Priority Data

Jul. 30, 1996 [DE] Germany ............... 196 30 646

[51] Int. Cl.$^6$ ................................. B62D 25/20
[52] U.S. Cl. ............... 296/204; 296/191; 296/205; 52/783.15
[58] Field of Search .................. 296/203.01, 204, 296/191, 205, 901; 52/783.1, 783.11, 783.14, 783.15

[56] References Cited

U.S. PATENT DOCUMENTS

| | | | |
|---|---|---|---|
| 2,100,561 | 11/1937 | Klliesrath | 296/204 |
| 2,216,670 | 10/1940 | Klavik | 296/204 |
| 2,297,198 | 9/1942 | Borgward | 296/204 |
| 2,356,008 | 8/1944 | Schafer | 296/191 |
| 3,034,823 | 5/1962 | Himka et al. | 296/204 |
| 3,173,383 | 3/1965 | Eggert, Jr. | 296/204 |
| 4,014,587 | 3/1977 | Eggert, Jr. | 296/204 |
| 4,898,419 | 2/1990 | Kenmochi et al. | 296/191 |
| 5,002,333 | 3/1991 | Kenmochi et al. | 296/204 |
| 5,562,329 | 10/1996 | Srock et al. | 296/203.01 |

FOREIGN PATENT DOCUMENTS

| | | |
|---|---|---|
| 0067602A1 | 12/1982 | European Pat. Off. . |
| 0650860A1 | 5/1995 | European Pat. Off. . |
| 97109471 | 12/1997 | European Pat. Off. . |
| 4316095 | 11/1994 | Germany ............... 296/204 |
| 0232083 | 9/1988 | Japan ............... 296/204 |
| 0195185 | 8/1989 | Japan ............... 296/204 |
| 406107235 | 4/1994 | Japan ............... 296/191 |

*Primary Examiner*—Dennis H. Pedder
*Attorney, Agent, or Firm*—Evenson, McKeown, Edwards & Lenahan, P.L.L.C.

[57] ABSTRACT

A floor assembly for a passenger car includes a double-walled floor provided with local reinforcements between laterally external side members and a center tunnel. To reduce the cost of manufacturing and assembly of the floor assembly, the double-walled floor on the driver and passenger sides is formed by at least one hollow member manufactured by the internal high-pressure shaping method. The respective hollow members abut the associated laterally external side member and the center tunnel and are permanently connected therewith. The reinforcements are formed by wall sections of the respective hollow body that are adjacent to one another areawise and are opposite one another.

26 Claims, 5 Drawing Sheets

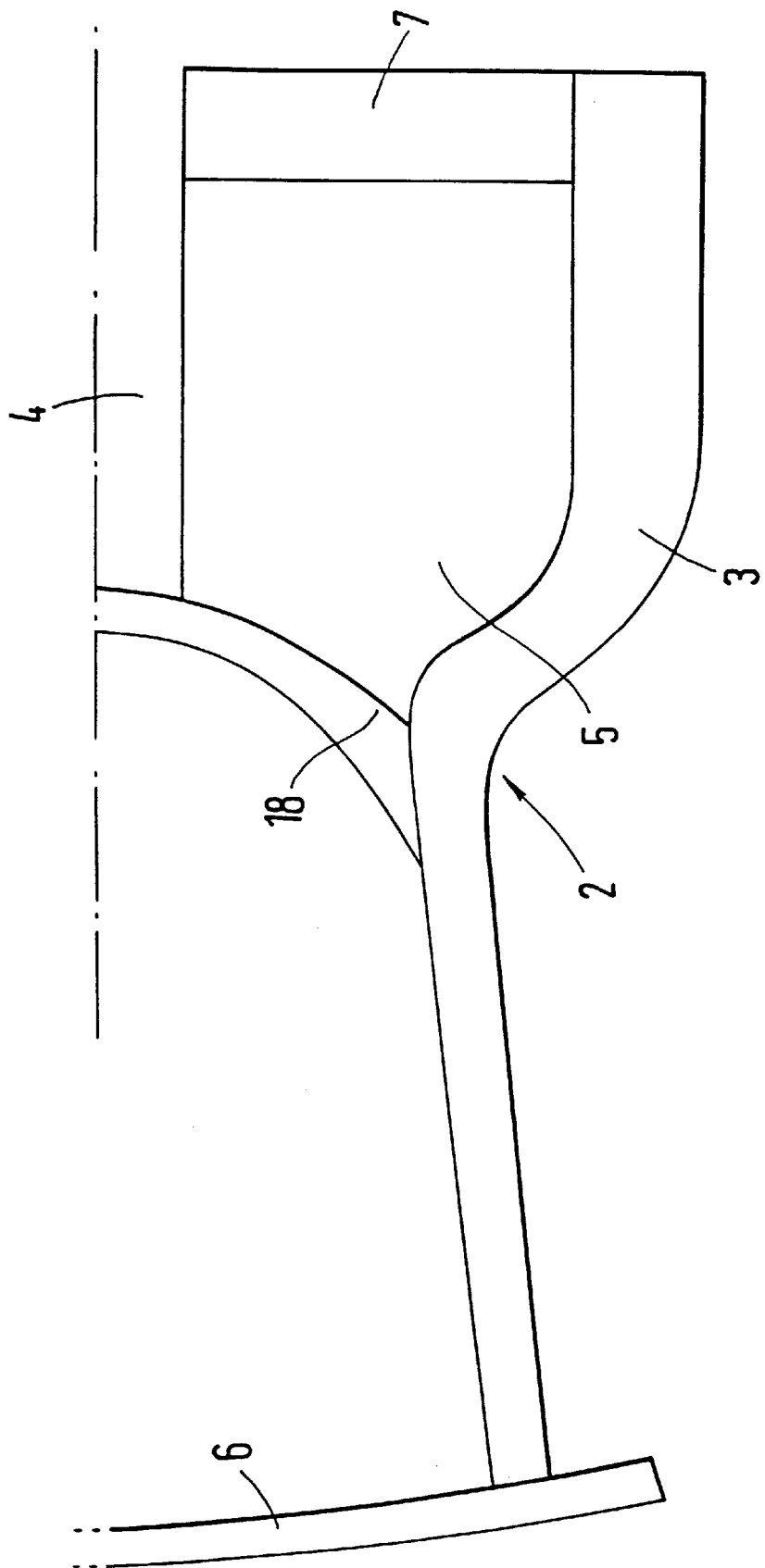

FLOOR ASSEMBLY FOR A PASSENGER CAR AND METHOD OF MAKING SAME

BACKGROUND AND SUMMARY OF THE INVENTION

This application claims the priority of German application 196 30 646.9 filed in Germany on Jul. 30, 1996, the disclosure of which is expressly incorporated by reference herein.

The invention relates to a floor assembly for motor vehicles, especially passenger cars with a double-walled floor with locally disposed reinforcements extending between lateral external side members and a center tunnel.

German Patent 934,628 teaches a floor assembly for motor vehicles, especially automobiles, wherein a double-walled floor with locally disposed reinforcements running lengthwise extends on both the driver and passenger sides between a side member located laterally and externally and a center tunnel. The side members, center tunnel, and double-walled floor with reinforcements are formed of a plurality of stamped panels.

This arrangement suffers from the disadvantage that, because of the structure consisting of many parts, high manufacturing and assembly costs are incurred for the floor assembly since a plurality of sheet-steel stamping tools is required and extensive welding must be performed.

An object of the invention is to improve on a floor assembly of the species recited at the outset in such fashion that the cost of manufacturing and assembly is significantly reduced.

According the invention, this object is achieved by providing an arrangement wherein the double-walled floor on driver and passenger sides is formed by at least one hollow member produced by the internal high-pressure shaping method, said at least one hollow member being permanently connected to a lateral external side member and a center tunnel, and wherein the reinforcements are formed by locally joined opposite wall sections of the at least one hollow member.

Primary advantages achieved with the invention consist in the fact that the number of structural elements and joining procedure are significantly reduced by making the double-walled floor using the internal high-pressure shaping system.

Many additional reinforcing parts can be eliminated since the reinforcements are constituted by wall sections of the respective hollow bodies that are located alongside one another in certain areas and are also opposite one another. Preferably, the lateral external side members and/or the center tunnel and/or a lower cross member located endwise are formed by parts shaped by internal high pressure. As a result, the number of individual parts is drastically reduced and tool costs are reduced as well. The required welded connections can be made by a welding robot.

Other objects, advantages and novel features of the present invention will become apparent from the following detailed description of the invention when considered in conjunction with the accompanying drawings.

BRIEF DESCRIPTION OF THE DRAWINGS

FIG. 8 is a partial top view of a further embodiment of the floor assembly.

DETAILED DESCRIPTION OF THE DRAWINGS

Figure 1:
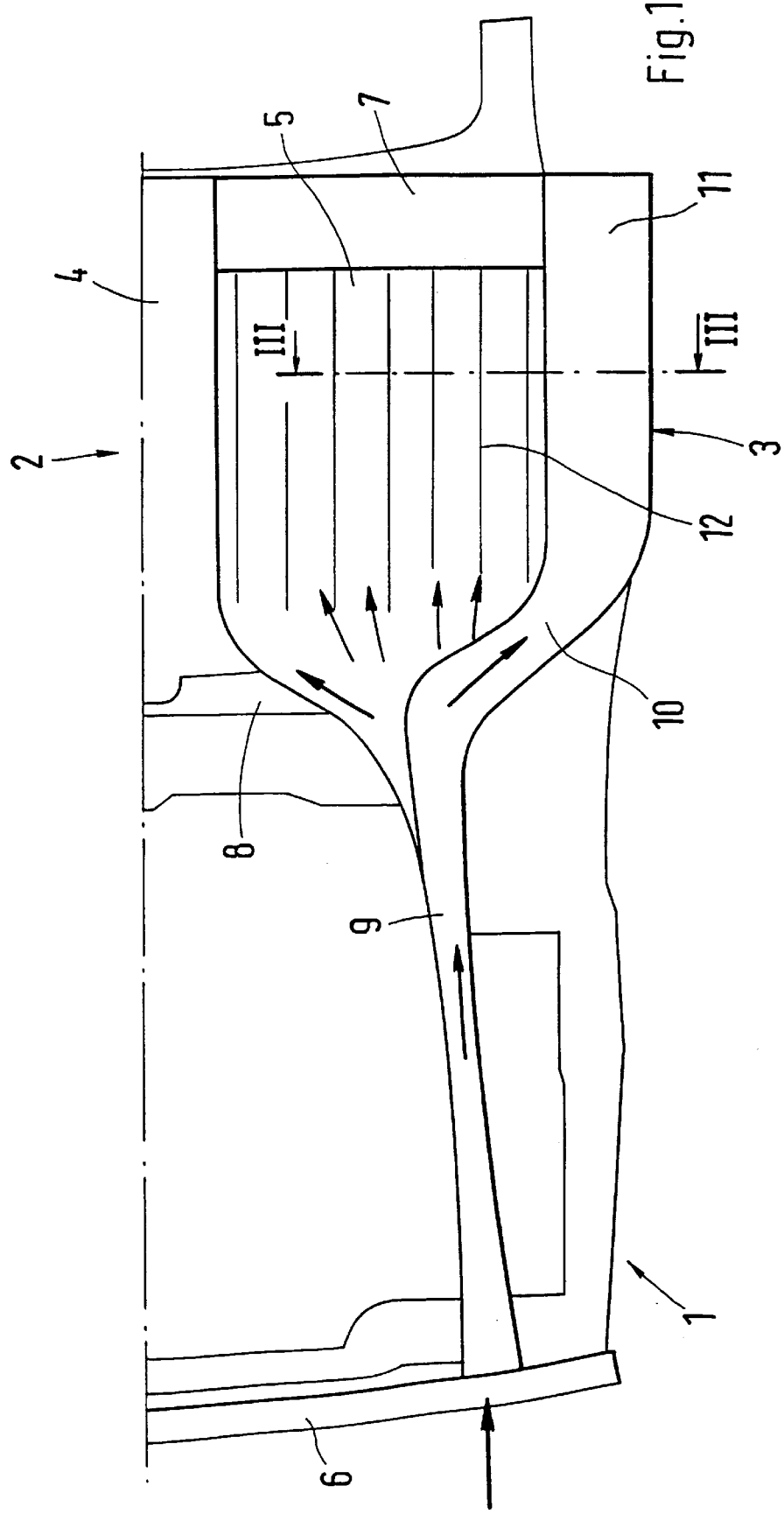
FIG. 1 is a partial top view of a floor assembly of a passenger car, constructed according to a preferred embodiment of the present invention.

FIG. 1 shows a partial area of a motor vehicle constituted by a passenger car 1, with the floor assembly 2 of said vehicle being composed essentially of laterally external side members 3, a center tunnel 4, and a double-walled floor 5.

According to FIGS. 1 and 8, the two lateral external side members 3 extend in one piece over the entire length of the vehicle and are produced by internal high-pressure shaping of a tubular blank. Side members 3 have different cross sections along their length, adapted to the stresses that develop. Side member 3 however can also be made in several parts, with the individual sections (for example side members at the front, sills, side members at the rear) being formed for example by sections made by extrusion molding or hydroforming.

In FIG. 1 only the forward section of side member 3 is shown, namely from a front cross member 6 to a seat cross member 7. In the vicinity of one end wall 8, a front side member section 9 changes into a laterally external sill section 11 by a bend 10 directed outward and downward.

Center tunnel 4 is formed by one or more sections formed by extrusion molded or also by a part (hydroformed part) formed by internal high-pressure shaping and terminates with its forward end approximately in the vicinity of upright end wall 8.

According to the invention, the double-walled floor 5 on the driver and passenger sides is formed in each case by a hollow body 12 made by the internal high-pressure shaping method, said body being adjacent to the lateral external side members 3 and center tunnel 4 and permanently connected therewith.

Local reinforcements 13 of double-walled floor 5 are formed by wall sections 14, 15 of the respective hollow bodies 12 that are located adjacent to one another and opposite one another areawise.

In the areas where wall sections 14, 15 are brought together, they can be additionally joined to one another by gluing, welding, riveting, or the like.

Figure 6:
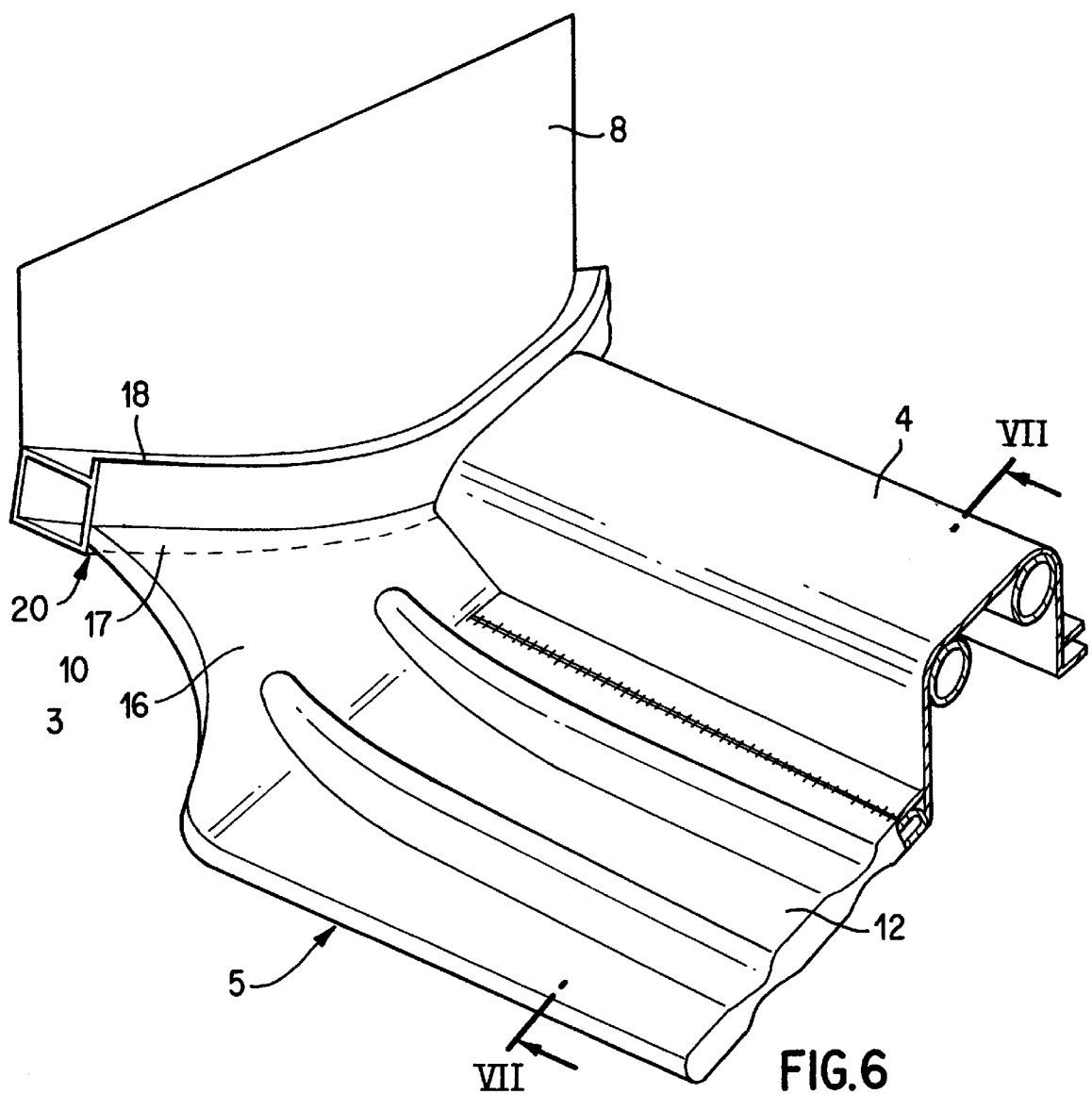
FIG. 6 is a perspective view of an embodiment of a floor assembly of a passenger car, constructed according to a further preferred embodiment of the present invention.

Each hollow body 12 has a double-walled section 16 in the vicinity of end wall 8 that extends upward diagonally. As schematically shown in FIG. 6, a forward open end 17 of hollow body 12 is brought up to a lower cross member 18 and permanently connected therewith (by welding for example). Lower cross member 18 connects the two lateral external side members 3 and is also connected to center tunnel 4. In addition a lower edge area of end wall 8 abuts cross member 18.

In the vicinity of offset 10 of the side member, the plate-shaped hollow body 12 is cut laterally to match the shape of offset 10.

Figure 7:
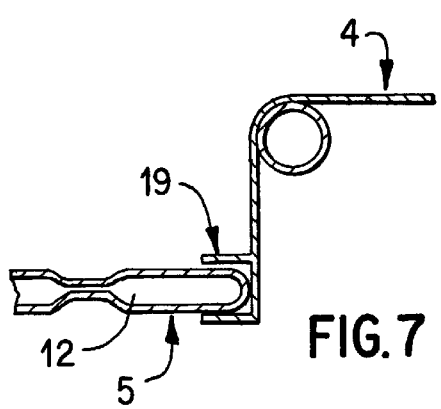
FIG. 7 is a sectional view along line VII—VII in FIG. 6.

According to FIGS. 6 and 7, receiving sections 19, 20 for the marginal area of hollow body 12 that forms floor 5 are shaped laterally on center tunnel 4 and cross member 18. In addition, shaped flanges can be provided on cross member 18 (FIG. 6).

Reinforcements 13 which extend in the lengthwise direction of the vehicle in the shown embodiments are manufactured by mechanical compression or by internal high-pressure shaping of hollow body 12.

The starting part for the large-area internal high-pressure shaped parts (for example the floor and tunnel) is a tubular or shaped blank made of steel or light metal that has a limited wall thickness and a large diameter or circumference.

In the case of tubular blanks, the ratio between the diameter and the wall thickness D/S is greater than 150 and preferably more than 200, with the wall thickness being between 1 and 2 mm and the outside diameter being greater than 250 mm. In non-tubular blanks the ratio of the circumference to the wall thickness is more than 400. The blank is shaped mechanically from the outside in a preshaping tool, with the inner cavity being filled with water. Following the preforming process, the part is given the desired final cross section by applying an internal pressure (internal high pressure shaping technology).

Figure 3:
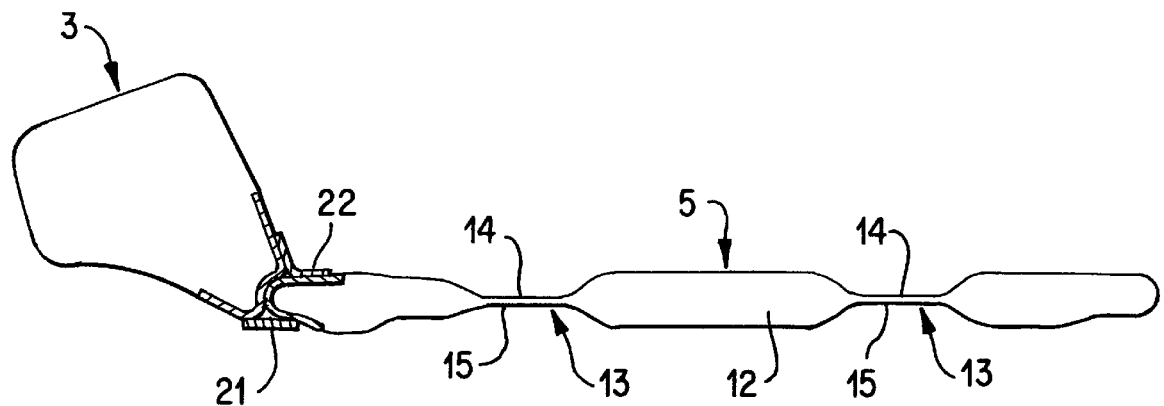
FIG. 3 is a sectional view along line III—III in FIG. 1, shown enlarged and rotated through 90°.
Figure 4:
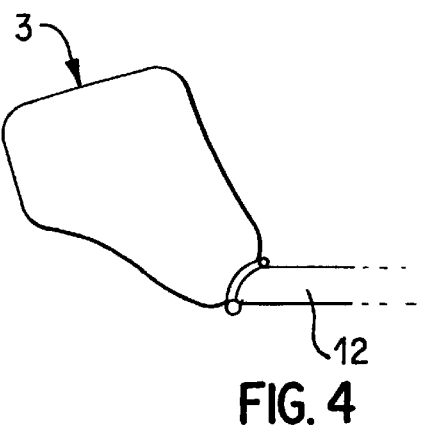
FIG. 4 is a section view corresponding to FIG. 3, showing another jointed connection being provided between the floor and the sill.
Figure 5:
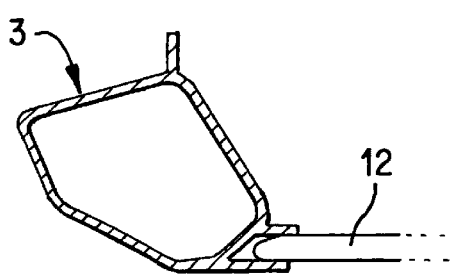
FIG. 5 is a sectional view corresponding to FIG. 3, showing another design for a floor assembly of an automobile.

According to FIG. 3 the outer end of hollow body 12 can be welded by additional strip-shaped sheet metal parts 21, 22 with side member 3 (for example resistance welding, roller seam welding, or laser welding). This type of connection requires much less energy than the MIG or WIG welded seams shown in FIG. 4.

Hollow body 12 can extend from end wall 8 to seat cross member 7 or up to an additional rear heel panel of the body, not shown in greater detail.

Figure 2:
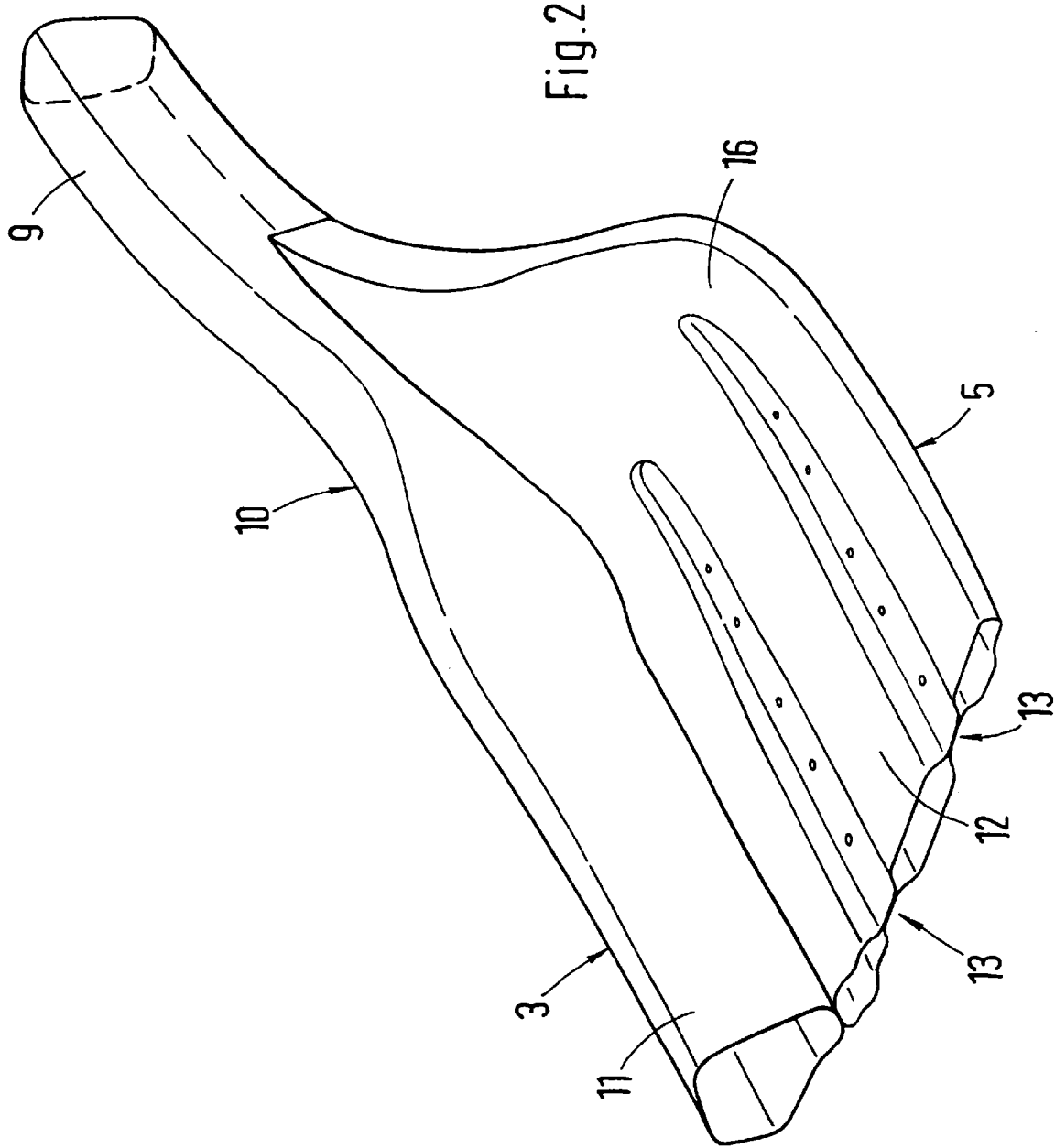
FIG. 2 is a perspective view of the connection between the floor and the lateral side members of the floor assembly of FIG. 1.

According to FIGS. 1 and 2, hollow body 12 is made plate-shaped only in the horizontally directed floor area. The edge 23 of hollow body 12 that faces center tunnel 4 twists outward or upward in the vicinity of end wall 8 and is connected to lateral side member 3 (laterally internally and possibly also beneath).

It is evident from FIG. 2 that the height of the hollow body in the endwise connecting area to the lengthwise member is much greater than the floor area that extends horizontally.

In the embodiment corresponding to FIG. 6 the height of the hollow body remains nearly constant over the entire length or increases slightly toward cross member 18.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Floor assembly for a passenger car, with a double-walled floor with locally disposed reinforcements extending between lateral external side members and a center tunnel,
    wherein the double-walled floor on each of a driver side and a passenger side is formed by a one-piece hollow member produced by internal high-pressure shaping, said hollow member being permanently connected to a respective one of said lateral external side members and to said center tunnel, and
    wherein the hollow member includes an upper wall and a lower wall, at least one of said upper wall and said lower wall being deformed toward the other of said upper wall and said lower wall to form the reinforcements.

2. Floor assembly according to claim 1, wherein said hollow member includes a main floor section extending in a horizontal plane and a forward section extending upwardly from a front end of said main floor section at an oblique angle thereto.

3. Floor assembly according to claim 1, wherein a forward end of said hollow member is open and is connected to a lower cross member.

4. Floor assembly according to claim 3, wherein the lower cross member is connected to the lateral external side members and to the center tunnel, and
    further comprising an upright end wall extending upwardly from the cross member.

5. Floor assembly according to claim 4, wherein the lateral external side members are each formed by one-piece hollow members manufactured by internal high-pressure shaping.

6. Floor assembly according to claim 1, wherein the center tunnel is formed by a section produced by one of extrusion molding and internal high-pressure shaping.

7. Floor assembly according to claim 1, wherein receiving sections for said hollow member are formed on at least one of the center tunnel, the lateral external side members, and a cross member.

8. Floor assembly according to claim 1, wherein an edge of the hollow member that faces the center tunnel in a vicinity of an end wall extends at an oblique angle to a longitudinal course of the center tunnel and is connected to the lateral external side member.

9. Floor assembly according to claim 1, wherein the reinforcements are formed by mechanical air compressed sections of the hollow member.

10. Floor assembly according to claim 1, wherein the opposite wall sections of the hollow member are additionally connected with one another in a vicinity of the reinforcements.

11. Floor assembly according to claim 9, wherein the opposite wall sections of the hollow member are additionally connected with one another in a vicinity of the reinforcements.

12. Floor assembly according to claim 2, wherein a forward end of said hollow member is open and is connected to a lower cross member.

13. Floor assembly according to claim 12, wherein the lower cross member is connected to the lateral external side members and to the center tunnel, and
    further comprising an upright end wall extending upwardly from the cross member.

14. Floor assembly according to claim 13, wherein the lateral external side members are each formed by one-piece hollow members manufactured by internal high-pressure shaping.

15. Floor assembly according to claim 14, wherein the center tunnel is formed by a section produced by one of extrusion molding and internal high-pressure shaping.

16. Floor assembly according to claim 15, wherein receiving sections for said hollow member are formed on at least one of the center tunnel, the lateral external side members, and a cross member.

17. Floor assembly according to claim 16, wherein an edge of the hollow member that faces the center tunnel in a vicinity of an end wall extends at an oblique angle to a longitudinal course of the center tunnel and is connected to the lateral external side member.

18. Floor assembly according to claim 16, wherein the reinforcements are formed by mechanical air compressed sections of the hollow member.

19. Floor assembly for a passenger car having a longitudinally extending center tunnel separating a driver side and a passenger side of the car and having respective lateral external side members extending along respective opposite sides of the car, said floor assembly comprising:
- a double-walled floor section connected at the center tunnel and a respective lateral external side member, said double-walled floor section being formed from a one-piece tubular member deformed by an internal high pressure shaping process and including upper and lower wall sections, at least one of said upper and lower wall sections being deformed toward the other of said upper and lower wall sections to form reinforcements intermediate the center tunnel and the respective lateral external side member.

20. Floor assembly for a vehicle having a longitudinally extending center tunnel and a lateral external side member, comprising:
- a double-walled floor section formed by a one-piece hollow body extending between said center tunnel and said lateral external side member, said hollow body including an upper wall and a lower wall,
  - at least one of said upper wall and said lower wall being deformed toward the other of said upper wall and said lower wall to form a plurality of reinforcements intermediate the center tunnel and the side member.

21. Floor assembly according to claim 20, wherein an interior side of said upper wall and an interior side of said lower wall abut each other at said reinforcements.

22. Floor assembly according to claim 20, wherein said hollow body includes a lateral edge connecting said upper wall and said lower wall, said lateral edge including a longitudinal portion extending in a longitudinal vehicle direction and an oblique portion extending obliquely from said longitudinal portion.

23. Floor assembly according to claim 20, further comprising a receiving section formed on said center tunnel, said receiving section including two spaced flanges between which a lateral portion of said hollow body is arranged.

24. Floor assembly according to claim 20, further comprising a receiving section formed on said side member, said receiving section including two spaced flanges between which a lateral portion of said hollow body is arranged.

25. Floor assembly according to claim 20, further comprising a welded connection between said hollow body and said side member.

26. Floor assembly according to claim 25, wherein said welded connection includes a pair of strip shaped sheet metal parts.

* * * * *